United States Patent
Kwun et al.

(10) Patent No.: US 8,380,571 B1
(45) Date of Patent: *Feb. 19, 2013

(54) AUTOMATED DETERMINATION OF VALIDITY OF COMPLAINTS

(75) Inventors: Michael Soonuk Kwun, San Francisco, CA (US); Kulpreet Rana, Bainbridge Island, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/627,919

(22) Filed: Nov. 30, 2009

Related U.S. Application Data

(63) Continuation of application No. 11/024,976, filed on Dec. 30, 2004, now Pat. No. 7,680,675.

(60) Provisional application No. 60/522,854, filed on Nov. 12, 2004.

(51) Int. Cl.
*G06Q 30/00* (2006.01)

(52) U.S. Cl. ............. 705/14.4; 705/14.41; 705/14.72; 705/14.73

(58) Field of Classification Search ............... 705/1, 14
See application file for complete search history.

(56) References Cited

U.S. PATENT DOCUMENTS

| | | | |
|---|---|---|---|
| 5,895,450 A | | 4/1999 | Sloo |
| 6,029,144 A | * | 2/2000 | Barrett et al. ............ 705/30 |
| 7,251,607 B1 | | 7/2007 | Veschi |
| 7,877,278 B1 | * | 1/2011 | Leonardo et al. ............ 705/4 |
| 2002/0010591 A1 | | 1/2002 | Pomerance |
| 2004/0059596 A1 | | 3/2004 | Vaidyanathan et al. |
| 2005/0125340 A1 | | 6/2005 | Lin et al. |

OTHER PUBLICATIONS

Handling consumer complaint information: Why and how?D-DMitchell, V-W. Logisitics Infiormation Management. Bedford: 1993. vol. 6, Iss. 3: p. 20, 7 pgs.*

The Wolrd Wide Web and the New World of Litigation: A basic introductionD DMichael J. Brady, Lawrence O Monin, Curtis R Ti Ngley, Tomothy L. Kelton. Defense Counsel Jounral. Chicago: Oct. 1999. vol. 66, Iss 4; p. 497, 17 pgs.*

Co-pending U.S. Appl. No. 11/024,976, filed Dec. 30, 2004 entitled "Automated Determination of Validity of Complaints" by Michael Soonuk Kwun et al., 32 pages.

Handling consumer complain information: Why and how?D-DMitchell, V-W. Logistics Information Management. Bedford: 1993, vol. 6, Iss. 3: p. 20, 7 pages.

The World Wide Web and the New World of Litigation: A basic introductionD DMichael J. Brady, Lawrence O Monin, Curtis R Ti Ngley, Tomothy L. Kelton. Defense Counsel Journal. Chicaco: Oct. 1999. vol. 66, Iss 4; p. 497, 17 pgs.

"eBay's Verified Rights Owner (VeRO) Program", http://pages.ebay.com/help/confidence/vero-rights-owner.html, Dec. 23, 2004 (Print Date), 2pp.

* cited by examiner

*Primary Examiner* — Candice D Wilson

(74) *Attorney, Agent, or Firm* — Harrity & Harrity, LLP

(57) ABSTRACT

The potential validity of complaints, including those relating to intellectual property rights, may be automatically determined. In one implementation, whether a complaint is determined to be valid is based on a history of complaints of the complaining party.

15 Claims, 6 Drawing Sheets

| Login Name | Password | ... | # of Complaints | # Valid Complaints |
|---|---|---|---|---|
| 510 | 520 | | 530 | 540 |

AUTOMATED DETERMINATION OF VALIDITY OF COMPLAINTS

RELATED APPLICATIONS

This application is a Continuation of U.S. application Ser. No. 11/024,976 filed Dec. 30, 2004 now U.S. Pat. No. 7,680,675 which claims priority under 35 U.S.C. §119 based on U.S. Provisional Application No. 60/522,854, filed Nov. 12, 2004, titled "AUTOMATED DETERMINATION OF VALIDITY OF INTELLECTUAL PROPERTY RIGHTS," the entire disclosures of which are incorporated herein by reference.

BACKGROUND

In the ever changing online world, content can be ephemeral. One group to which this can pose problems is intellectual property rights owners. Certain intellectual property rights, such as trademark and copyright rights, may be infringed by a particular web site, posting, or advertisement for a short or undefined period of time. For example, a trademark may be infringed by an advertisement that only appears to some visitors of a particular site.

For a rights owner, policing their rights can be a difficult task. In addition to the non-trivial task of locating the potentially infringing content, the intellectual property rights owner can face the additional burden of convincing the web site owner to remove the content in a timely manner. In the situation in which the web site owner hosts content from a number of clients, such as a web site owner posting third-party advertisements, the web site owner must balance the legal rights of the intellectual property rights owner against the right of its client to advertise as they choose. Manually evaluating each complaint can be a time consuming process that introduces significant delay between the time of the initial complaint and the time at which a decision is made whether to remove the content about which a complaint has been lodged.

SUMMARY

One aspect is directed to a machine-implemented method for processing an intellectual property related complaint. The method includes receiving a complaint from a complaining party requesting that content be suspended from being served from a server and determining whether to comply with the complaint based on a history relating to the complaining party.

Another aspect is directed to a method including receiving a complaint from a complaining party requesting that content be suspended from being served from a server, manually evaluating the complaint to determine whether the complaint is valid when the complaining party has not submitted a threshold number of prior complaints, and automatically evaluating the complaint when the complaining party has submitted a threshold number of prior complaints, where the automatic evaluation includes assuming the complaint is valid when a predetermined or greater portion of the prior complaints were determined to be valid.

Yet another aspect is directed to a computing device including logic to serve advertisements to users and an automated decision engine. The automated decision engine is configured to receive complaints relating to intellectual property infringement in the advertisements and to automatically make an initial determination of whether to suspend serving a complained-about advertisement in response to the complaint.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a diagram illustrating an exemplary data structure through which the automated IP decision component may log complaints.

DETAILED DESCRIPTION

The following detailed description of the invention refers to the accompanying drawings. The detailed description does not limit the invention.

Overview

Techniques are described herein that provide for automated processing of intellectual property rights complaints. In one implementation, trademark-based complaints are automatically evaluated and potentially offending content removed from a web site. The automatic evaluation may be based on information relating to the complaining party. For example, the automatic evaluation may be based on information about the past accuracy of the complaints of the complaining party. Thus, a party that has a history of submitting valid complaints may be more likely to get a favorable automatic evaluation than a party that submits many specious complaints.

System Description

Figure 1:
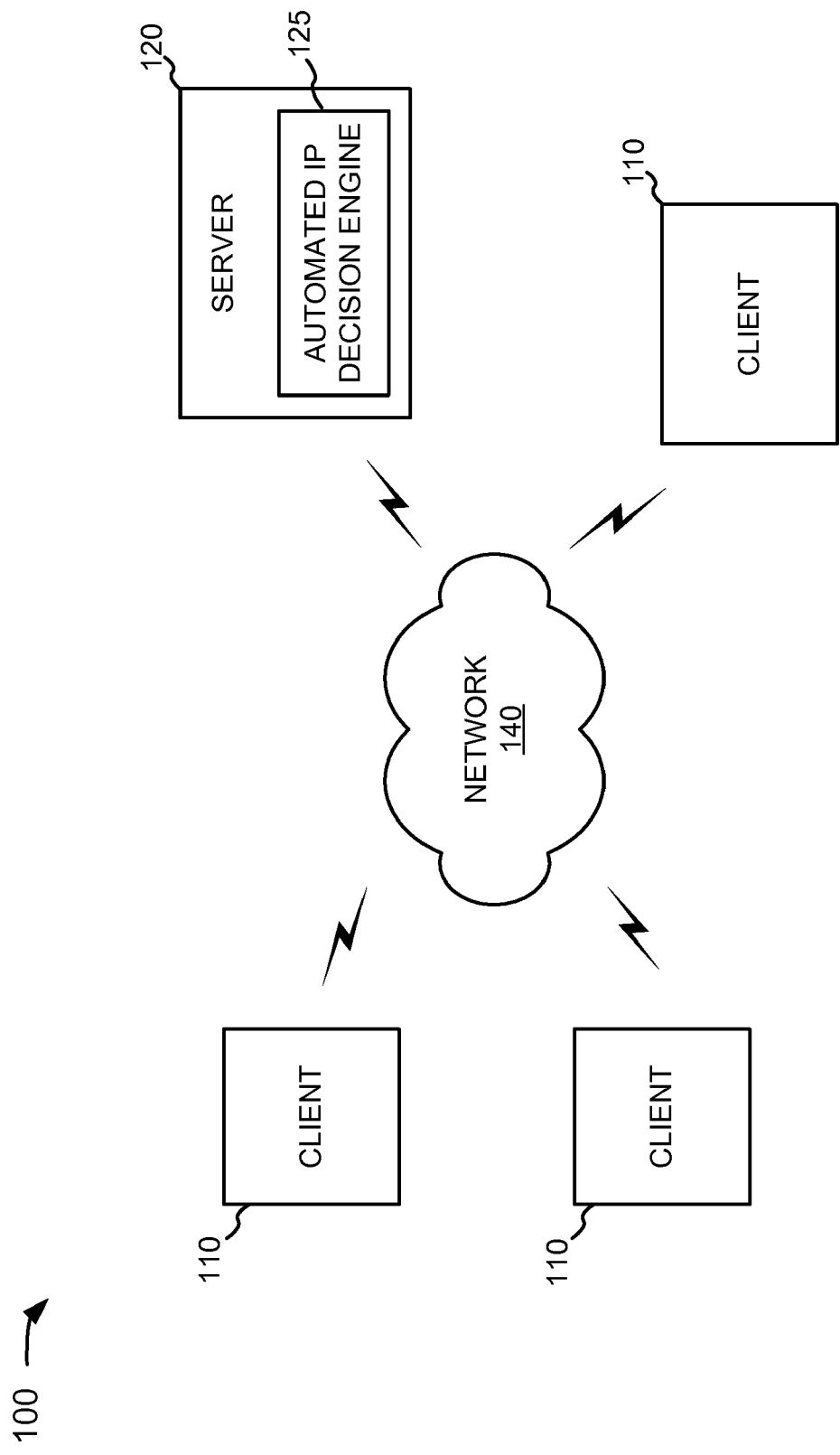
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include multiple clients 110 connected to a server 120 via a network 140. Network 140 may include a local area network (LAN), a wide area network (WAN), a telephone network, such as the Public Switched Telephone Network (PSTN), an intranet, the Internet, or a combination of networks. Three clients 110 and one server 120 have been illustrated as connected to network 140 for simplicity. In practice, there may be more clients and/or servers. Also, in some instances, a client may perform one or more functions of a server and a server may perform one or more functions of a client.

A client 110 may include a device such as a wireless telephone, a personal computer, a personal digital assistant (PDA), a lap top, or another type of computation or communication device, a thread or process running on one of these devices, and/or an object executable by one of these devices.

Server 120 may include a server device that processes, searches, and/or maintains documents and images in a manner consistent with the principles of the invention. Clients 110 and server 120 may connect to network 140 via wired, wireless, or optical connections.

Server 120, in one implementation, may be a search engine that receives search queries from clients 110 and returns links to results relevant to the search queries back to clients 110. Server 120 may also return advertisements with the search query results. For example, third parties may contract with the operator of server 120 to display their advertisements when their advertisements are relevant to a search query.

Server 120 may implement a number of processes that assist in serving content. Consistent with an aspect of the invention, server 120 may include a tool, referred to herein as automated IP decision engine 125, that assists in handling intellectual property (IP) complaints (e.g., trademark and copyright complaints) submitted by parties that believe their IP rights are being violated. Automated IP decision engine 125 is described in more detail below.

Exemplary Client/Server Architecture

Figure 2:
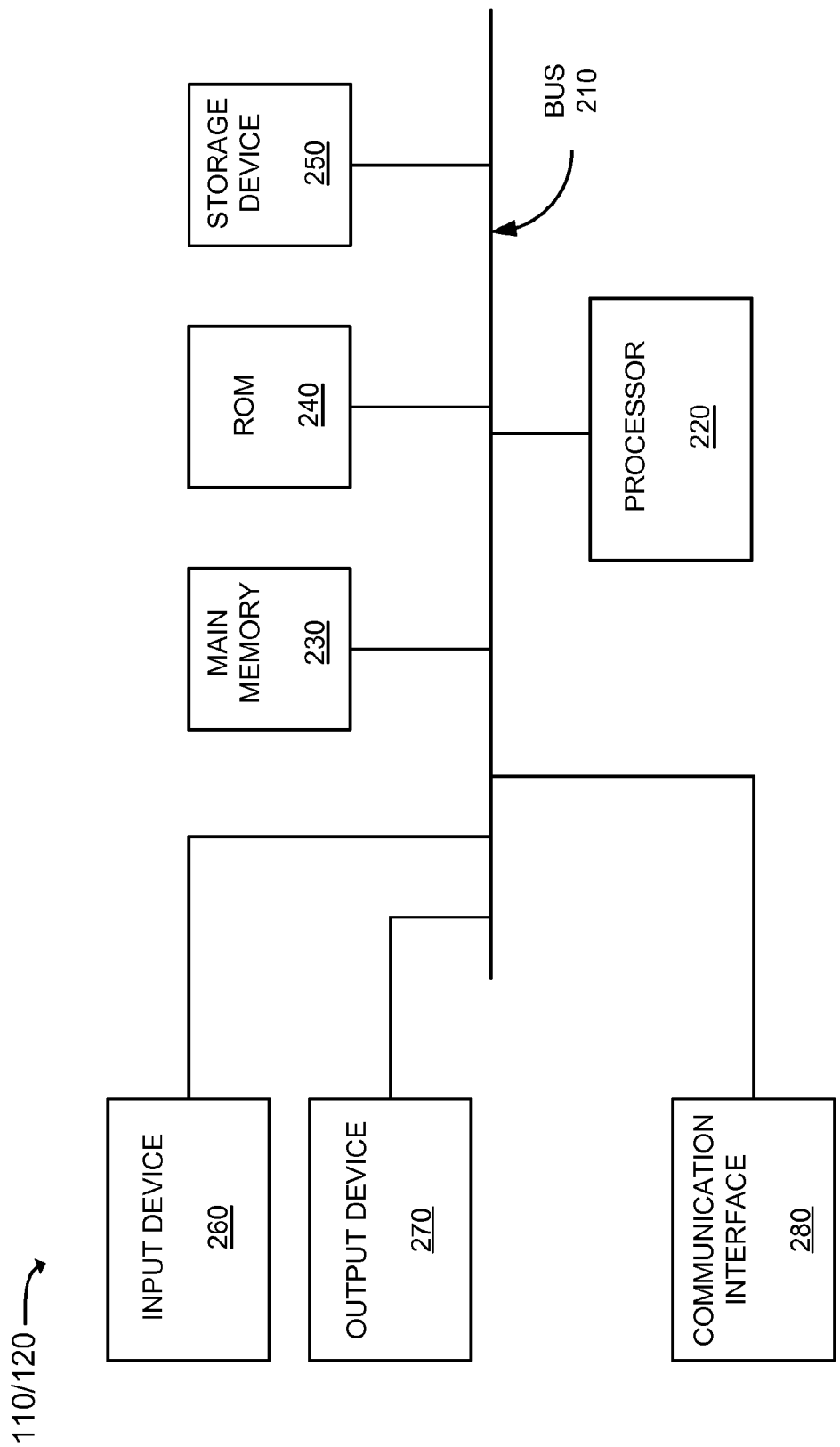
FIG. 2 is an exemplary diagram of a client or server shown in FIG. 1.

FIG. 2 is an exemplary diagram of a client 110 or server 120. Client/server 110/120 may include a bus 210, a processor 220, a main memory 230, a read only memory (ROM) 240, a storage device 250, an input device 260, an output device 270, and a communication interface 280. Bus 210 may include conductors that permit communication among the components of client/server 110/120.

Processor 220 may include conventional processors, microprocessors, or processing logic that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit a user to input information to client/server 110/120, such as a keyboard, a mouse, a pen, voice recognition and/or biometric mechanisms, etc. Output device 270 may include one or more conventional mechanisms that output information to the user, including a display, a printer, a speaker, etc. Communication interface 280 may include any transceiver-like mechanism that enables client/server 110/120 to communicate with other devices and/or systems. For example, communication interface 280 may include mechanisms for communicating with another device or system via a network, such as network 140.

Automated IP decision engine 125 may be stored in a computer-readable medium, such as memory 230. A computer-readable medium may be defined as one or more physical or logical memory devices and/or carrier waves.

The software instructions defining automated IP decision engine 125 may be read into memory 230 from another computer-readable medium, such as data storage device 250, or from another device via communication interface 280. The software instructions contained in memory 230 may cause processor 220 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software. Additionally, multiple computing devices may function together to implement the functionality of a single server 120 or of automated IP decision engine 125.

Automated IP Decision Engine

Figure 3A:
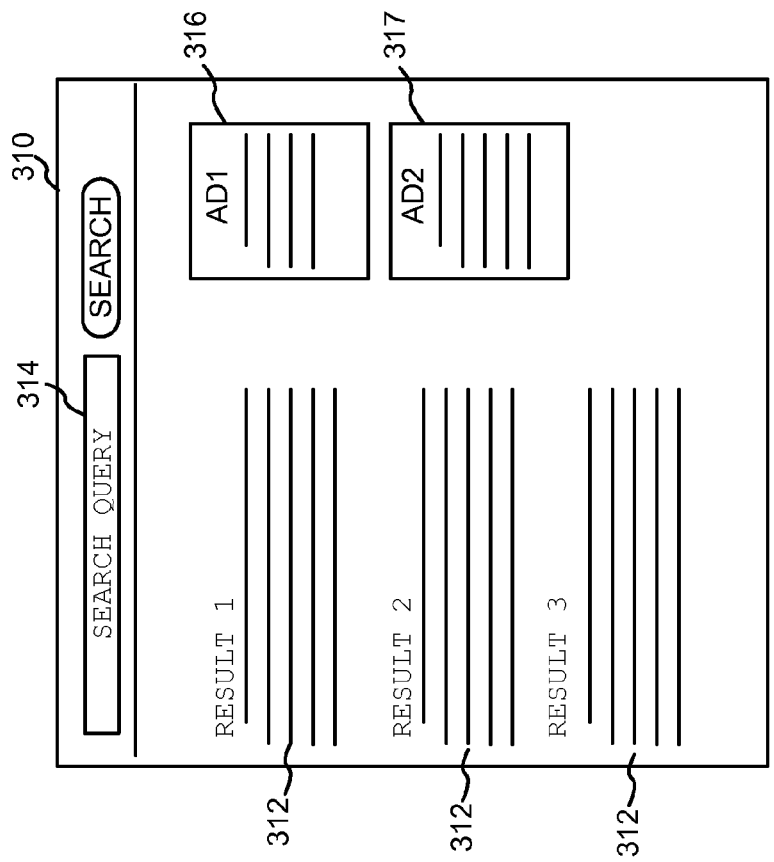
FIG. 3A is a diagram illustrating an exemplary web page that may be provided by a server to clients.

FIG. 3A is a diagram illustrating an exemplary web page 310 that may be provided by server 120 to clients 110. In this example, web page 310 is a web page that displays results 312 that relate to a search query 314 submitted by one of clients 110. Web page 310 may additionally display advertisements, such as advertisements 316 and 317, which may be text and/or graphical advertisements that were determined by server 120 to be relevant to results 312 and/or search query 314.

Occasionally, a party may complain to the content host (e.g., the owner/operator of server 120) that one of advertisements 316 or 317 include content that infringes their intellectual property rights. An advertisement may, for example, include a phrase or other content in a manner that the complaining party believes is inconsistent with its own trademark rights. Automated IP decision component 125 may evaluate the complaint and determine whether the potentially offending advertisement should be suspended from being provided to clients 110.

Figure 3B:
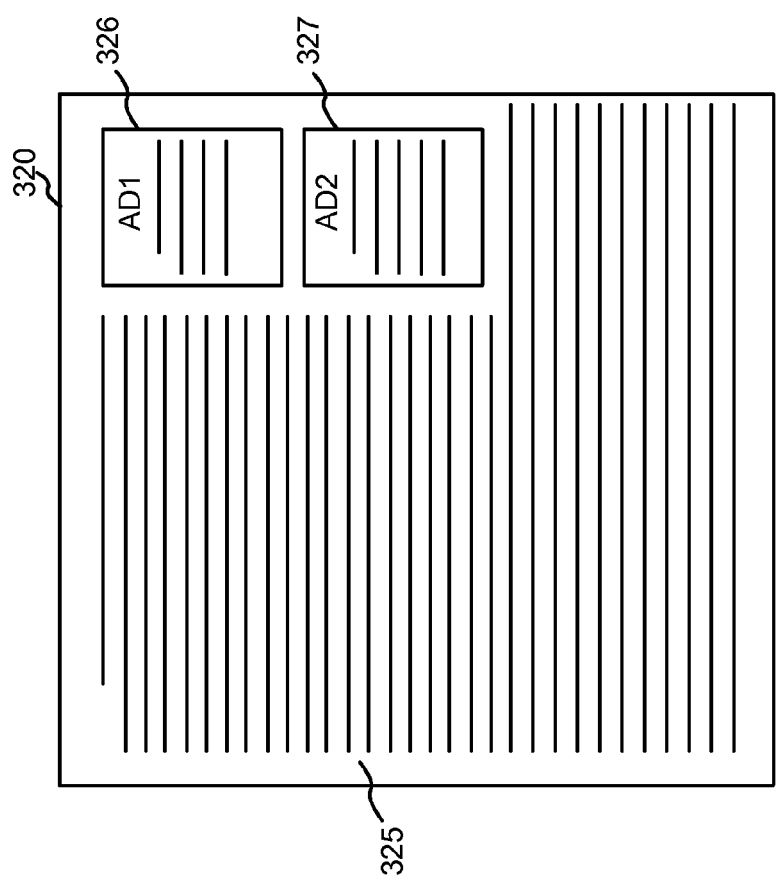
FIG. 3B is a diagram illustrating another exemplary web page that may be provided by a server to clients.

FIG. 3B is a diagram illustrating another exemplary web page 320. In this example, web page 320 contains content 325 and one or more advertisements 326 and 327. Web page 320 may generally be hosted by a party distinct from the party that provides advertisements 326 and 327. For example, web page 320 may be a web page from a web site targeted to auto enthusiasts. Advertisements 326 and 327 may be advertisements selected by and displayed on web page 320 by an entity distinct from the entity that hosts the web site. As with web page 310, advertisements 326 and 327 in web page 320 may infringe the intellectual property rights of other parties. In the context of this type of web page, complaints relating to the advertisements may be handled by automated IP decision component 125 which is associated with the host of advertisements 326 and 327.

Figure 4:
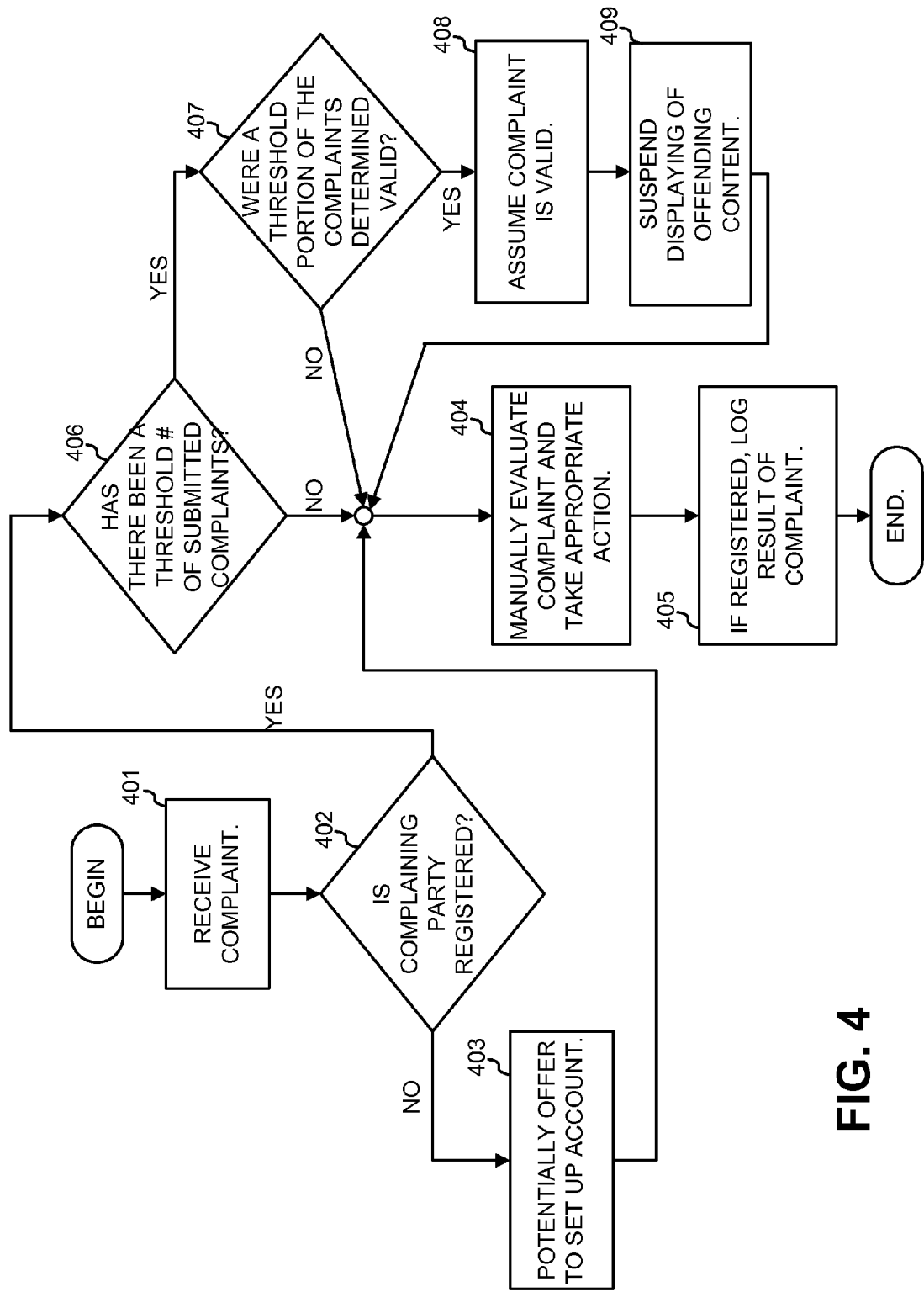
FIG. 4 is a flow chart illustrating exemplary operations performed by an automated IP decision engine in handling complaints relating to IP issues.

FIG. 4 is a flow chart illustrating exemplary operations performed by automated IP decision engine 125 in handling complaints relating to IP issues, such as complaints from trademark owners relating to advertisements generated as shown in FIGS. 3A and 3B. More generally, the complaints typically state that some content (e.g., advertisements, a web page, a portion of a web page, etc.) under the control of the entity being complained to (called the "content host" herein) is in violation of some applicable law or policy. For example, a complaint may state that an advertisement infringes a trademark of the complaining entity.

To begin, a complaint may be received by the content host from the complaining party (act 401). The complaint may be received through an automated interface hosted at server 120. For example, a complaining party may fill out a web-based form that may be received by automated IP decision engine 125.

If the complaining party has not previously submitted a complaint, the party may be registered and associated with an account by the content host (acts 402 and 403). In some implementations, the creation of the account may be automatic upon receiving the complaint, and in other implementations, a human employee of the content host may first review the credentials of the complaining party before creating the account. Providing the complaining party with an account allows for the complaint history of the complaining party to be tracked.

The complaint of a party that does not have an account or that has just set up an account may be manually evaluated (act 404). In other words, an administrator may review the complaint and evaluate it on its merits. The evaluation may be based on applicable laws and/or company policy. Appropriate action may be taken based on the manual evaluation. For example, offending content may be suspended from further display if the complaint is determined to be valid. If the complaint is determined to be not valid or questionable, the complaining party may be notified and the content may continue to be displayed. Because human review of a complaint is inherently a more time consuming and costly process than automated review, there may be a delay before any action is taken.

If the complaining party has previously registered and has an account, the account may include a login name/password through which the complaining party can login and submit future complaints. Additionally, the login name/password may allow the party to perform other functions, such as allowing the complaining party to view advertisements or other potentially infringing content using an enhanced interface. For example, advertisements may be shown such that the advertisements are not counted as impressions for purposes of charging the advertisers. Additionally, the logged-in party may be intentionally limited in its ability to view advertisements such that advertisements that are clearly not potentially infringing rights of the logged-in party may not be shown to the logged-in party. For example, advertisements targeted to a geographic region in which no rights are claimed may not be shown. Further, although advertisements may normally be refrained from being shown for a number of other reasons not related to potential infringement of rights (e.g., there are more available advertisements than advertising slots, certain advertisements are deemed too similar to other advertisements, an advertisement is targeted to a specific geographic region and browsing party is not in that region, the advertising budget for an advertiser has been used up, etc.), these reasons may be ignored for the logged-in party. In other words, the logged-in party can view all advertisements that could be triggered, not just those that are eligible at the current moment. This may make it easier for the logged-in party to locate content that they believe violates their intellectual property rights.

Figure 5:
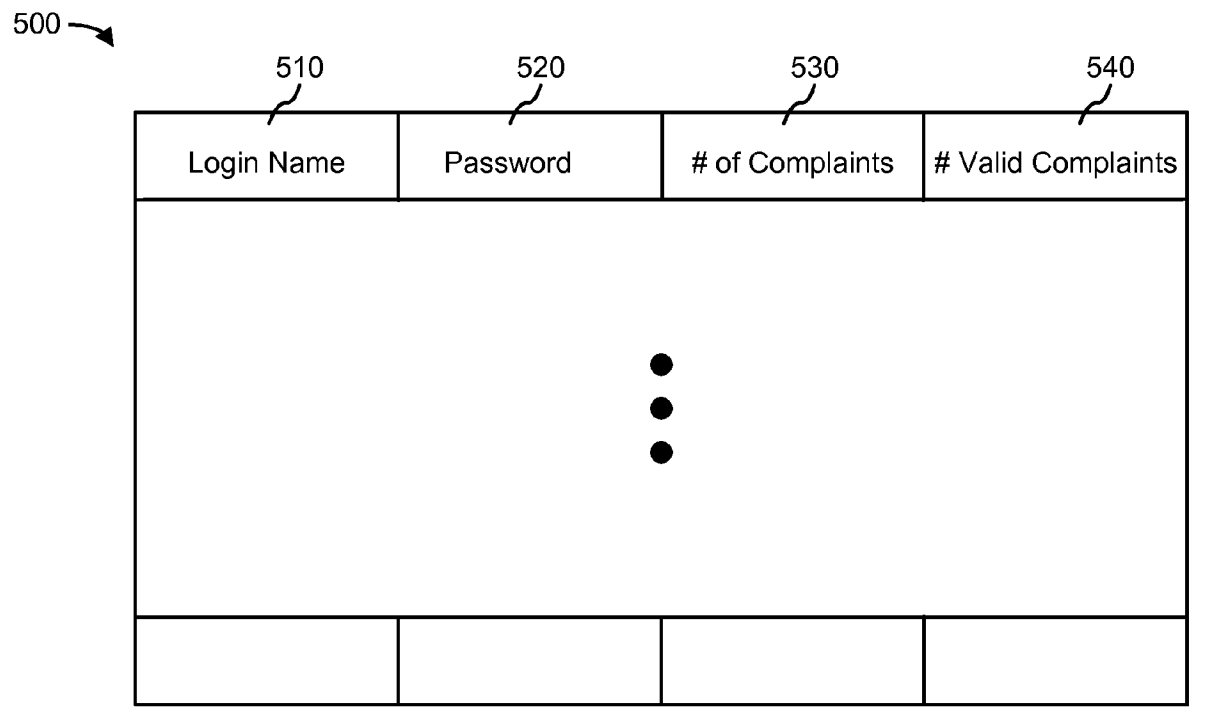

A complaint, after being manually evaluated (act 404) may be logged (act 405). FIG. 5 is a diagram illustrating an exemplary data structure through which automated IP decision component 125 may log complaints. The data structure may include a table 500 that stores, for each account, a field 510 for the login name, a field 520 for the password, a field 530 for storing the number of submitted complaints, and a field 540 for storing the number of submitted complaints that were determined by the content host to be valid. One of ordinary skill in the art will recognize that other fields could be included in table 500 that store additional information relating to the complaining parties.

Referring back to FIG. 4, when the complaining party is registered and submits a complaint, automated IP decision engine 125 may determine whether the complaining party has submitted a threshold number (e.g., 10) of complaints (act 406). The threshold value may generally be established at a number at which the content host feels that the complaining party has established a "track record" of complaints. If the complaining party is below this number, the complaint may be queued for manually processing (acts 406 and 404).

When the number of submitted complaints is above the threshold, however, automated IP decision component 125 may make an initial determination of whether to immediately assume that the complaint is valid or not valid based on the past history of complaints associated with the complaining party. More particularly, in one implementation, if the portion of past complaints that were determined to be valid is above a second threshold (e.g., 75%), the pending complaint may be automatically assumed to be valid (acts 407 and 408). The offending content may then be immediately suspended from further display (act 409) pending further manual review (act 404). On the other hand, if the portion of past complaints that were valid is below the second threshold (act 407), no assumption is made about the accused content and the content may continue to be displayed until it is manually evaluated (act 404).

Optionally, in some implementations, if the portion of past complaints that were not successfully validated is extremely high (i.e., a large portion of the past complaints were not valid), the new complaint may be cancelled without any manual review.

The techniques performed above in acts 404-409 allow newly received IP-related complaints to be immediately processed and acted upon. This can potentially increase the general level of approval of the content host in the community-at-large, assist the content host in complying with applicable laws, and, by providing incentive for potential complaining parties to refrain from submitting specious complaints, may decrease the overall number of complaints received.

Additional Features

A number of variations or enhancements on the above-described techniques can be implemented. Some of these variations/enhancements will be described below.

Information about the complaining parties, such as information stored in table 500, may be used to enhance the manual evaluation performed in act 404. The complaints waiting for manual review may be placed in a graphical list in which the entries in the list are color-coded or coded in some other manner. For example, a red indicator next to a complaint may be used to indicate that the advertisement being complained about has already been suspended (indicating a high likelihood that the complaint is valid). The complaining party's rate of previous valid complaints may also be graphically or textually illustrated in the list.

In another possible implementation, when a complaint is first received, automated IP decision component may transmit a note (e.g., an email) to the advertiser that asks the advertiser to confirm/deny or comment on the complaint. If the advertiser denies the complaint, they may be asked to also submit a reason (e.g., authorized to use the mark, nominative use, not a violation of content host's policy, etc.). If the advertiser does not respond within a preset time period, the advertisement may be automatically suspended without any further manual review. If a counternotice is subsequently received from the advertiser, the advertisement may be allowed to continue running and the counternotice may be provided to the complainant along with text explaining why the advertisement is still running.

In yet another possible implementation, instead of making the determination of whether a complaint is valid based on simple historical portion of valid complaints, a more complicated function could be used. For example, the previous complaints could be weighted based on the age of the complaints. Older complaints (such as complaints from a relatively long time ago), may be deemphasized.

Conclusion

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code—it being understood that a person of ordinary skill in the art would be able to design software and control hardware to implement the aspects based on the description herein. Some of the features identified as being performed by the content host may be performed by the client.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed:

1. A method performed by a server device, the method comprising:
   receiving, by the server device, a complaint from a complaining party requesting that an advertisement be suspended from being served from the server device;
   determining a quantity of complaints previously submitted by the complaining party that were determined to be valid;
   automatically suspending, by a processor associated with the server device, the advertisement from being available to be presented to users, where the automatically suspending the advertisement from being presented to users is performed when the quantity of complaints, submitted by the complaining party that were determined to be valid, is greater than a threshold;
   flagging, by the processor, the complaint for manual evaluation of validity; and
   associating, by the processor, an indicator with the complaint in a graphical list of complaints flagged for manual evaluation, where the indicator indicates that the advertisement has been automatically suspended.

2. The method of claim 1, further comprising:
   associating a textual or graphical indicator with the complaint in the graphical list, where the textual or graphical indicator indicates the complaining party's rate of previous valid complaints.

3. The method of claim 1, further comprising:
   transmitting, by the server device, a message to an advertiser associated with the advertisement, where the message requests the advertiser to comment on the complaint, in response to receiving the complaint; and
   where the automatically suspending the advertisement from being presented to users is performed when the advertiser does not respond to the message within a particular time period.

4. The method of claim 3, further comprising:
   requesting the advertiser to provide information as to why the complaint should be denied, in response to the advertiser responding to the message within the particular time period.

5. The method of claim 1, where determining the quantity of complaints previously submitted by the complaining party that were determined to be valid includes:
   weighing previous complaints submitted by the complaining party based on an age of the complaints.

6. The method of claim 5, where the weighing previous complaints submitted by the complaining party by age of the complaints includes:
   assigning a smaller weight to an older complaint than to a newer complaint.

7. One or more memory devices storing instructions executable by a processor, the one or more memory devices comprising:
   one or more instructions to receive a complaint from a complaining party requesting that an advertisement be suspended from being served from a server device;
   one or more instructions to determine a quantity of complaints previously submitted by the complaining party that were determined to be valid;
   one or more instructions to automatically suspend the advertisement from being available to be presented to users, where the one or more instructions to automatically suspend the advertisement from being available to be presented to users is performed when the quantity of complaints, submitted by the complaining party that were determined to be valid, is greater than a threshold;
   one or more instructions to flag the complaint for manual evaluation of validity; and
   one or more instructions to associate an indicator with the complaint in a graphical list of complaints flagged for manual evaluation, where the indicator indicates that the advertisement has been automatically suspended.

8. The one or more memory devices of claim 7, further comprising:
   one or more instructions to associate a textual or graphical indicator with the complaint in the graphical list, where the textual or graphical indicator indicates the complaining party's rate of previous valid complaints.

9. The one or more memory devices of claim 7, further comprising:
   one or more instructions to transmit a message to an advertiser associated with the advertisement, where the message requests the advertiser to comment on the complaint, in response to receiving the complaint; and
   where the one or more instructions to automatically suspend the advertisement from being presented to users include one or more instructions to perform the automatically suspending of the advertisement from being presented to users when the advertiser does not respond to the message within a particular time period.

10. A system comprising:
    one or more server devices to:
      receive a complaint from a complaining party requesting that an advertisement be suspended from being served from the one or more server devices;
      determine a quantity of complaints previously submitted by the complaining party that were determined to be valid;
      automatically suspend the advertisement from being available to be presented to users, where the automatically suspending the advertisement from being presented to users is performed when the quantity of complaints, submitted by the complaining party that were determined to be valid, is greater than a threshold;

flag the complaint for manual evaluation of validity; and associate an indicator with the complaint in a graphical list of complaints flagged for manual evaluation, where the indicator indicates that the advertisement has been automatically suspended.

11. The system of claim 10, where the one or more server devices are further to:

associate a textual or graphical indicator with the complaint in the graphical list, where the textual or graphical indicator indicates the complaining party's rate of previous valid complaints.

12. The system of claim 10, where the one or more server devices are further to:

transmit a message to an advertiser associated with the advertisement, where the message requests the advertiser to comment on the complaint, in response to receiving the complaint; and where the automatically suspending the advertisement from being presented to users is performed when the advertiser does not respond to the message within a particular time period.

13. The system of claim 10, where the one or more server devices are further to:

request the advertiser to provide information as to why the complaint should be denied, in response to the advertiser responding to the message within the particular time period.

14. The system of claim 10, where determining the quantity of complaints previously submitted by the complaining party that were determined to be valid includes:

weighing previous complaints submitted by the complaining party based on an age of the complaints.

15. The system of claim 14, where the weighing previous complaints submitted by the complaining party by age of the complaints includes:

assigning a smaller weight to an older complaint than to a newer complaint.

* * * * *